United States Patent
Peker et al.

(10) Patent No.: US 8,324,830 B2
(45) Date of Patent: Dec. 4, 2012

(54) COLOR MANAGEMENT FOR FIELD-SEQUENTIAL LCD DISPLAY

(75) Inventors: Arkadiy Peker, Glen Cove, NY (US); Tamir Langer, Givataim (IL); Dror Korcharz, Bat Yam (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 358 days.

(21) Appl. No.: 12/695,191

(22) Filed: Jan. 28, 2010

(65) Prior Publication Data

US 2010/0207531 A1 Aug. 19, 2010

Related U.S. Application Data

(60) Provisional application No. 61/153,658, filed on Feb. 19, 2009.

(51) Int. Cl.
G05F 1/00 (2006.01)
H05B 37/00 (2006.01)
(52) U.S. Cl. .................... 315/291; 315/312
(58) Field of Classification Search .................. 315/291, 315/307, 308, 312, 224, 209 R
See application file for complete search history.

(56) References Cited

U.S. PATENT DOCUMENTS

| | | | |
|---|---|---|---|
| 4,064,530 A | 12/1977 | Kaiser et al. |
| 4,695,885 A | 9/1987 | Kim |
| 5,387,921 A | 2/1995 | Zhang et al. |
| 5,701,058 A | 12/1997 | Roth |
| 5,717,978 A | 2/1998 | Mestha |
| 6,069,676 A | 5/2000 | Yuyama |
| 6,127,783 A | 10/2000 | Pashley et al. |
| 6,194,839 B1 | 2/2001 | Chang |
| 6,201,353 B1 | 3/2001 | Chang et al. |
| 6,373,964 B1 | 4/2002 | Geissler et al. |
| 6,411,046 B1 | 6/2002 | Muthu |
| 6,441,558 B1 | 8/2002 | Muthu |
| 6,521,879 B1 | 2/2003 | Rand et al. |

(Continued)

FOREIGN PATENT DOCUMENTS

WO 2004084170 A1 9/2004
(Continued)

OTHER PUBLICATIONS

Perduijn et al; "Light Output Feedback Solution for RGB LED Backlight Application"; SID 00 Digest; 2000; pp. 1-3; The Society for Information Display, San Jose, California.

(Continued)

Primary Examiner — Minh D A
(74) Attorney, Agent, or Firm — Simon Kahn

(57) ABSTRACT

A method of color control for a backlight utilizing colored light emitting diodes (LEDs), the method constituted of: providing a plurality of colored LED strings constituted of at least three different colors; lighting each of the plurality of colored LED strings to provide a backlight; providing a period wherein none of the colored LED strings are lit; obtaining during the provided period when none of the colored LED strings are lit, an indication of an ambient light; obtaining during the provided period when the colored LED strings are lit, an indication of the optical output of the colored LED strings; and controlling the lighting of the provided plurality of colored LED strings responsive to the received indication of ambient light and the received indication of the output of the colored LED strings. Preferably, the method is performed in cooperation with an on-board color sensor.

17 Claims, 5 Drawing Sheets

U.S. PATENT DOCUMENTS

| | | |
|---|---|---|
| 6,576,881 B2 | 6/2003 | Muthu |
| 6,611,249 B1 | 8/2003 | Evanicky et al. |
| 6,624,847 B1 | 9/2003 | Abdellatif |
| 6,630,801 B2 | 10/2003 | Schuurmans |
| 6,830,737 B2 | 12/2004 | Ramstack |
| 6,870,525 B2 | 3/2005 | Kawabata et al. |
| 6,894,442 B1 | 5/2005 | Lim et al. |
| 7,001,059 B2 | 2/2006 | Han et al. |
| 7,009,343 B2 | 3/2006 | Lim et al. |
| 7,012,382 B2* | 3/2006 | Cheang et al. ............. 315/291 |
| 7,176,438 B2 | 2/2007 | Bamji et al. |
| 7,208,713 B2 | 4/2007 | Ishiguchi |
| 7,255,462 B2 | 8/2007 | Tseng |
| 7,315,139 B1* | 1/2008 | Selvan et al. ............. 315/291 |
| 7,315,288 B2 | 1/2008 | Livingston et al. |
| 7,348,949 B2 | 3/2008 | Lee et al. |
| 7,391,407 B2 | 6/2008 | Kim |
| 7,393,128 B2 | 7/2008 | Sakai et al. |
| 7,423,705 B2* | 9/2008 | Len-Li et al. ............. 349/61 |
| 7,446,303 B2 | 11/2008 | Maniam et al. |
| 7,498,753 B2* | 3/2009 | McAvoy et al. ............. 315/291 |
| 7,696,964 B2* | 4/2010 | Lankhorst et al. ............. 345/82 |
| 2001/0035853 A1 | 11/2001 | Hoelen et al. |
| 2002/0179816 A1 | 12/2002 | Haines et al. |
| 2003/0189211 A1 | 10/2003 | Dietz |
| 2004/0135522 A1 | 7/2004 | Berman et al. |
| 2005/0117190 A1 | 6/2005 | Iwauchi et al. |
| 2005/0212459 A1 | 9/2005 | Patel et al. |
| 2005/0231127 A1 | 10/2005 | Yamamoto et al. |
| 2005/0231459 A1 | 10/2005 | Furukawa |
| 2006/0007097 A1 | 1/2006 | Ichikawa |
| 2006/0038769 A1 | 2/2006 | Marra et al. |
| 2006/0050529 A1 | 3/2006 | Chou et al. |
| 2006/0056178 A1 | 3/2006 | Len-Li et al. |
| 2006/0097978 A1 | 5/2006 | Ng et al. |
| 2006/0108933 A1 | 5/2006 | Chen |
| 2006/0132423 A1 | 6/2006 | Travis |
| 2006/0187181 A1 | 8/2006 | Kim |
| 2006/0187233 A1 | 8/2006 | Diefenbaugh et al. |
| 2006/0221047 A1 | 10/2006 | Tanizoe et al. |
| 2006/0244508 A1 | 11/2006 | Zheng et al. |
| 2007/0046485 A1 | 3/2007 | Grootes et al. |
| 2007/0063961 A1 | 3/2007 | Kuroki |
| 2007/0115228 A1 | 5/2007 | Roberts et al. |
| 2007/0146266 A1 | 6/2007 | Yasuda et al. |
| 2007/0182701 A1 | 8/2007 | Kim et al. |
| 2007/0188441 A1 | 8/2007 | Tanaka et al. |
| 2007/0216622 A1 | 9/2007 | Kim et al. |
| 2008/0018267 A1 | 1/2008 | Arakawa et al. |
| 2008/0191643 A1* | 8/2008 | Roberts et al. ............. 315/300 |
| 2008/0272277 A1* | 11/2008 | Wei ............. 250/205 |

FOREIGN PATENT DOCUMENTS

| | | |
|---|---|---|
| WO | 2005048659 A2 | 5/2005 |
| WO | 2005111976 A1 | 11/2005 |
| WO | 2006005033 A2 | 1/2006 |
| WO | 2006070323 A1 | 7/2006 |
| WO | 2006129260 A2 | 12/2006 |
| WO | 2007049180 A1 | 5/2007 |
| WO | 2008056321 A1 | 5/2008 |

OTHER PUBLICATIONS

Perduijn et al; "Light Output Feedback Solution for RGB LED Backlight Application"; SID 03 Digest; 2003; pp. 1254-1256; The Society for Information Display, San Jose, California.

Chen et al; "LED Back-Light Driving System for LCD Panels"; Applied Power Electronics Conference and Exposition; Published Mar. 19-23, 2006; IEEE New York.

Li, Perry Y. and Dianat, Sohail A.; "Robust Stabilization of Tone Reproduction Curves for the Xerographic Printing Process"; IEEE Transaction on Control Systems Technology, vol. 9, No. 2, Mar. 2001; pp. 407-415; published IEEE, New York.

Li, Perry Y. and Dianat, Sohail A., "Robust Stabilization of Tone Reproduction Curves for the Xerographic Printing Process"; 1998 IEEE Conference on Control Applications; Sep., Trieste , 1998; published IEEE, New York.

Gu, Y., N. Narendran, T. Dong and H. Wu; Spectral and Luminous Efficiency Change of High Power LEDs Under Different Dimming Methods; Sixth International Conference on Solid State Lighting, Proceedings of SPIE; 2006; published by Society of Photo-Optical Instrument Engineers, Bellingham, WA.

* cited by examiner

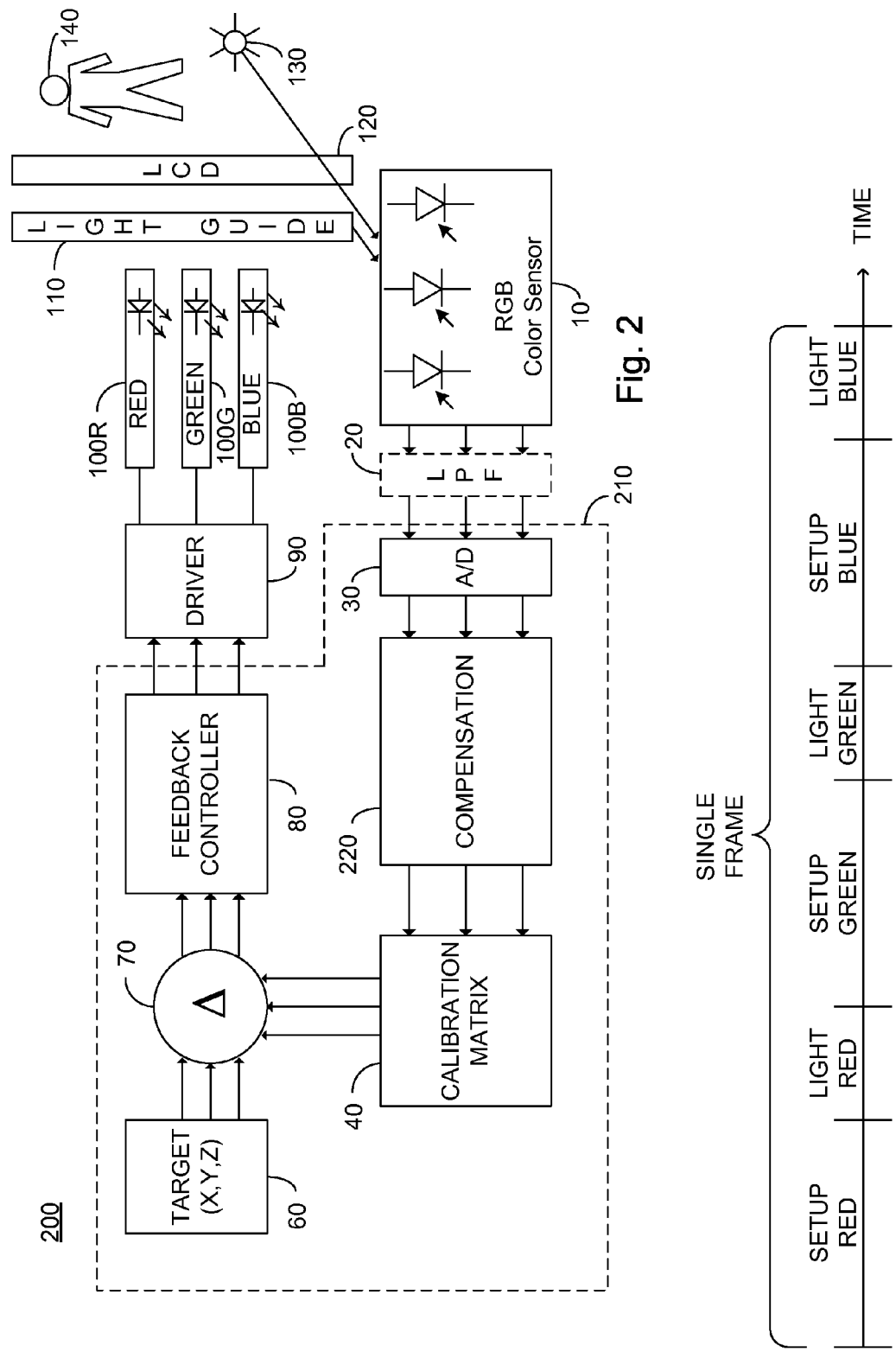

COLOR MANAGEMENT FOR FIELD-SEQUENTIAL LCD DISPLAY

CROSS-REFERENCE TO RELATED APPLICATIONS

This application claims priority from U.S. Provisional Patent Application Ser. No. 61/153,658 filed Feb. 19, 2009 entitled "Color Management for Field-Sequential LCD Display", the entire contents of which are incorporated herein by reference.

TECHNICAL FIELD

The present invention generally relates to the field of lighting and more particularly to a color manager in cooperation with a color sensor arranged to control the color and luminance of a field-sequential display responsive to an ambient light condition.

BACKGROUND OF THE INVENTION

LEDs with an overall high luminance are useful in backlighting for Liquid Crystal Display (LCD) based monitors and televisions, collectively hereinafter referred to as a matrix display. In a large LCD matrix display, typically, the LEDs are supplied in one or more strings of serially connected LEDs, thus sharing a common current. Matrix displays typically display the image as a series of frames, with the information for the display being drawn from left to right in a series of descending lines during the frame.

In order to supply a backlight for the matrix display, one of field-sequential lighting and non-field-sequential backlighting is employed. In non-field-sequential backlighting, either one or more strings of "white" LEDs are utilized as a luminaire, the white LEDs typically comprising a blue LED with a phosphor, which absorbs the blue light emitted by the LED to emit a white light, or one or more individual strings of colored LEDs, functioning as a luminaire, are placed in proximity so that in combination their light is seen as white light. In a field-sequential system, colored LED strings are exclusively utilized, and the colored LED strings typically are lit sequentially. The LCD is synchronized with the sequential lighting of the colored LED strings. In effect, at least three images are displayed for each frame; a red image, a green image and blue image, with the colored images being displayed sequentially. Such a field-sequential system is described in U.S. Patent Application Publication S/N US 2006/0097978 A1, published May 11, 2006 to Ng et al, the entire contents of which is incorporated herein by reference.

A field sequential system advantageously does not require color filters for each of the pixels, since the color is directly supplied by the backlight LEDs. As a result, an increased percentage of the light produced by the backlight LEDs is transmitted through the LCD and perceived by the viewer. Unfortunately, this advantage leads to certain difficulties in color control.

The human eye has receptors responsive to different wavelengths of light. In particular, it is understood that three different types of receptors are typically found, each associated with a certain wavelength. Thus, in order to completely describe a color sensation, i.e. brightness, hue and saturation, at least three values are required. The three values may be described in any of a plurality of color spaces, also known as colorimetric systems, which may be standardized color spaces such as the CIE 1931 color space, or an RGB color space associated with a particular color sensor. Translation between color spaces is typically accomplished mathematically, with translation between standardized color spaces being accomplished in cooperation with known fixed values, and translation between particular color spaces and standardized color spaces typically requiring certain calibration information. The term tri-stimulus values as used herein, is meant to include any set of values which represent the luminance and chromaticity of a color sensation, in any color space.

In particular, colored LEDs change their luminance and hue characteristics as a function of age and temperature. Typically, a color sensor is thus provided, in optical communication with the source lighting. The output of the color sensor is fedback to a controller or manager, which is operative to adjust the drive signals of the respective colored LEDs so as to achieve a pre-determined color temperature. In non-field-sequential backlighting, where more than 90% of the light produced by the backlight LEDs is not transmitted through for perception by the viewer, ambient light is similarly strongly attenuated prior to reaching the color sensor. As a result, changes in ambient light do not currently significantly impact the color control of a non-field-sequential backlight.

As indicated above, in a field-sequential system, optical attenuation between the LEDs and the viewer is significantly reduced. As a result, the impact of ambient light on the color sensor used to control the colored LEDs is increased. The impact of ambient light can have negative consequences in regard to the color control loop. In a first consequence, the ambient light impacts the luminance values of the color control loop. Thus, increased ambient light is read as increased luminance from the LEDs, resulting in decreased output of the LEDs responsive to increased ambient light. Unfortunately, this is the opposite of what is desired, since with increased ambient light an increased light output is desired to prevent washout of the image.

In a second consequence, the color of the ambient light impacts the chromaticity values of the color control loop. Thus, in an environment in which an ambient light of a certain hue is experienced, the color control loop will reduce the color components associated with ambient light hue. This is similarly unfortunate, as the resultant colors associated with the ambient light hue will be washed out.

SUMMARY OF THE INVENTION

In view of the discussion provided above and other considerations, the present disclosure provides methods and apparatus to overcome some or all of the disadvantages of prior and present field-sequential color control methods and apparatuses. Other new and useful advantages of the present methods and apparatus will also be described herein and can be appreciated by those skilled in the art.

This is provided in certain embodiments by a color control system for a field sequential backlight utilizing colored light emitting diodes (LEDs), the color control system comprising: a color controller; an LED driver responsive to the color controller; a plurality of colored LED strings constituted of at least three different colors responsive to the LED driver; and a color sensor, exhibiting a tri-stimulus output, in optical communication with the plurality of colored LED strings, the color controller coupled to the tri-stimulus output of the color sensor, wherein the color controller is operative to: light each of the plurality of colored LED strings via the LED driver; provide a period wherein none of the colored LED strings are lit; receive from the color sensor, during the provided period when none of the colored LED strings are lit, an indication of an ambient light received at the color sensor; receive from the color sensor, during the provided period when the colored LED strings are lit, an indication of the optical output of the colored LED strings; and control the LED driver responsive to the received indication of ambient light and the received indication of the output of the colored LED strings.

In an exemplary embodiment, the lighting of the plurality of colored LED strings and the received indication of the optical output of the colored LED strings is sequential, and the indication of the optical output of the colored LED strings is an indication of the optical output of each color of the colored LED strings.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 2 illustrates a high level schematic diagram of an exemplary second embodiment of a color control system comprising a color controller exhibiting a calibration matrix functionality and a compensation functionality, the compensation functionality arranged to receive from a color sensor both samples of ambient light and light from the colored LED strings;

FIG. 3 illustrates a timing diagram of an exemplary embodiment of field-sequential lighting operation for the embodiments of FIGS. 1 and 2.

DETAILED DESCRIPTION OF THE PREFERRED EMBODIMENTS

Figure 1:
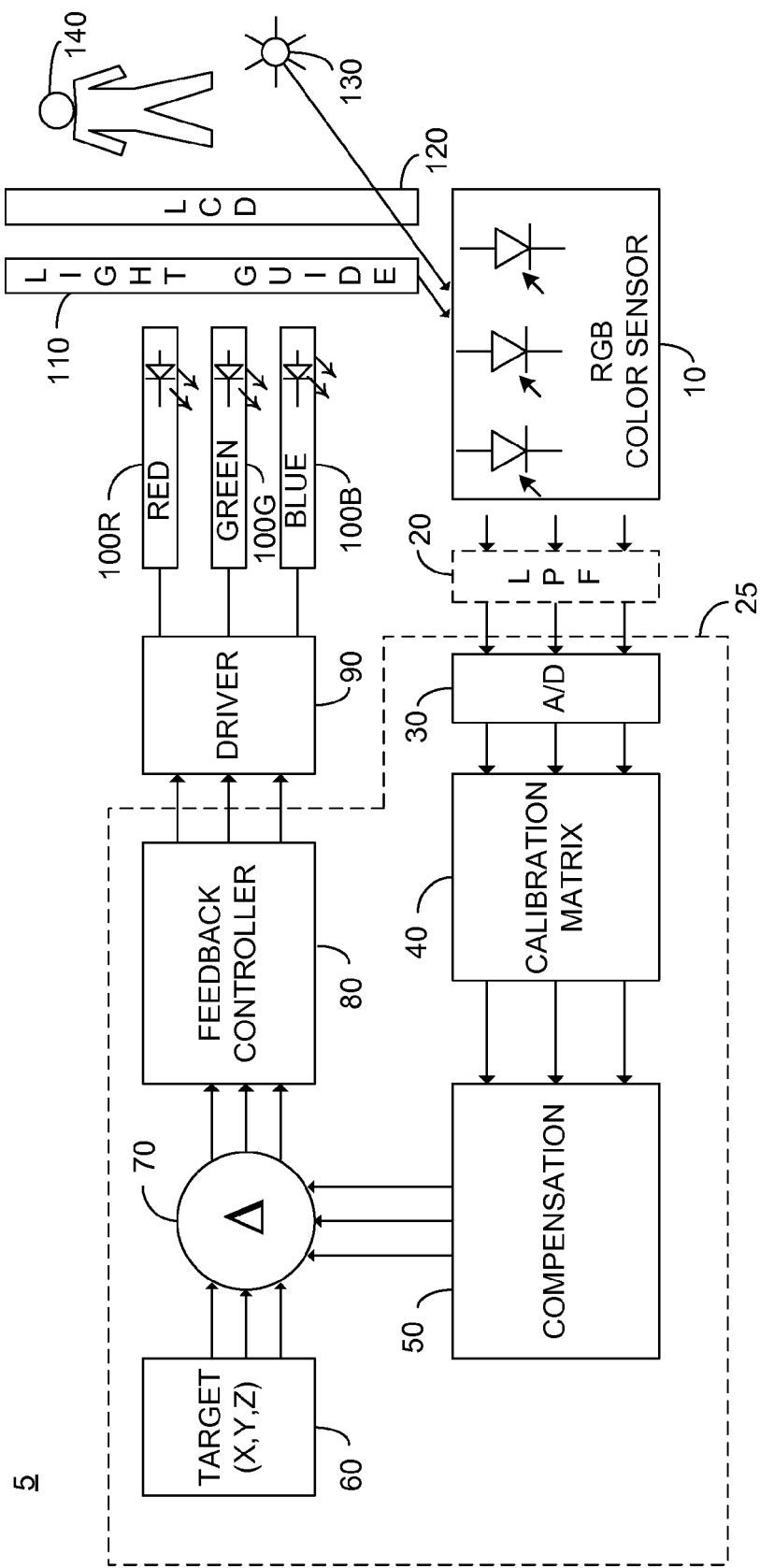
FIG. 1 illustrates a high level schematic diagram of an exemplary first embodiment of a color control system comprising a color controller exhibiting a calibration matrix functionality and a compensation functionality, the calibration matrix functionality arranged to receive from a color sensor both samples of ambient light and light from the colored LED strings.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

FIG. 1 illustrates a high level schematic diagram of an exemplary first embodiment of a color control system 5 comprising a color controller exhibiting a calibration matrix functionality and a compensation functionality, the calibration matrix functionality arranged to receive from a color sensor both samples of ambient light and light from the colored LED strings. In particular, color control system 5 comprises: a color sensor 10 exhibiting a tri-stimulus output; an optional low pass filter (LPF) 20; a color controller 25; an LED driver 90; a plurality of different colored LED strings generally denoted 100, illustrated as a red LED string 100R, a green LED string 100G and a blue LED string 100B; a light guide 110; and an LCD 120. FIG. 1 further illustrates: an ambient light source 130; and a viewer 140. Color controller 25 comprises: an A/D converter 30; a calibration matrix functionality 40; a compensation functionality 50; a source of target color and luminance information 60; a difference generator functionality 70; and a feedback controller functionality 80.

Color sensor 10 is arranged to receive light from light guide 110 comprising light from each of red LED string 100R, green LED string 100G and blue LED string 100B and a portion of ambient light from ambient light source 130, the portion of ambient light received may be directed by light guide 110 or directly impinge on color sensor 10. The tri-stimulus outputs of color sensor 10 are passed through optional low pass filter 20 to the respective inputs of A/D converter 30. The tri-stimulus outputs of A/D converter 30 are connected to respective inputs of calibration matrix functionality 40, and the tri-stimulus output of calibration matrix functionality 40 are connected to respective inputs of compensation functionality 50. The tri-stimulus outputs of compensation functionality 50 are connected to respective first inputs of difference generator functionality 70, and the tri-stimulus outputs of source of target color and luminance information 60 are connected to respective second inputs of difference generator functionality 70. The outputs of difference generator functionality 70 are connected to respective inputs of feedback controller functionality 80, and the outputs of feedback controller functionality 80 are fed to respective inputs of LED driver 90. The outputs of LED driver 90 are respectively connected to the inputs of red LED string 100R, green LED string 100G and blue LED string 100B. Light guide 110 is arranged to receive the optical outputs of red LED string 100R, green LED string 100G and blue LED string 100B and guide the optical outputs to light LCD 120 so that information displayed thereon is visible to viewer 140.

Any and all of optional low pass filter 20, A/D converter 30, calibration matrix functionality 40, compensation functionality 50, source of target color and luminance information 60, difference generator functionality 70, feedback controller functionality 80 and LED driver 90 may be implemented in a single unit, as part of a microcontroller or field programmable gate array. In one embodiment color controller 25 further comprises optional LPF 20 instituted digitally responsive to the output of A/D converter 30. In another embodiment, color controller 25 further comprises LED driver 90. In one embodiment, source of target color and luminance information 60 is supplied by a separate video controller, and in another embodiment source of target color and luminance information 60 is stored in local registers. In one embodiment LED driver 90 is constituted of a pulse width modulation (PWM) functionality. In one embodiment feedback controller functionality 80 comprises a proportional integral (PI) controller, and in another embodiment feedback controller functionality 80 comprises a proportion integral differential (PID) controller. In one embodiment (not shown), optional LPF 20 is replaced with an integrator as described in pending patent application Ser. No. 12/136,095 entitled "Optical Sampling and Control Element", published Jan. 1, 2009 to Blaut et at as US 2009/0001253 A1, the entire contents of which are incorporated herein by reference.

In operation, light from both colored LED strings 100 and ambient light source 130 are received at color sensor 10. A period is provided by LED driver 90 wherein none of colored LED strings 100 are lit. The output of color sensor 10, which during this provided period represents only the impact of light arriving from ambient light source 130, is sampled via A/D converter 30 during the provided period. As described below a plurality of periods may be provided by LED driver 90 in each frame wherein none of colored LED strings 100 are lit, and in an exemplary embodiment an average of the periods is used.

Calibration matrix functionality 40 is operative to convert the tri-stimulus values output by color sensor 10 representative of the impact of light arriving from ambient light source 130 to a color space consonant with the color space of the output of source of target color and luminance information 60. Mathematically, the operation of calibration matrix 40 can in one embodiment be represented as:

$$\begin{bmatrix} Xamb \\ Yamb \\ Zamb \end{bmatrix} = [C] * \begin{bmatrix} R \\ G \\ B \end{bmatrix} \quad \text{EQ. 1}$$

where $$\begin{bmatrix} R \\ G \\ B \end{bmatrix}$$

represents the tri-stimulus output of color sensor 10 sampled during the provided period when none of colored LED strings 100 are lit, and [C] is a calibration matrix defined to convert the tri-stimulus values output by color sensor 10 to a color space consonant with the color space of the output of source of target color and luminance information 60. In an exemplary embodiment, calibration matrix [C] is defined at a particular operating point for colored LED strings 100. In another embodiment, a plurality of calibration matrixes [C] are provided, each associated with a particular temperature or current level. Mathematically, [C] may be expressed as:

$$\begin{bmatrix} C_{11} & C_{12} & C_{13} \\ C_{21} & C_{22} & C_{23} \\ C_{31} & C_{32} & C33 \end{bmatrix}.$$

The vector result of EQ. 1 thus represents the impact of light arriving from ambient light source 130 received at color sensor 10.

In an exemplary embodiment color control system 5 is operated as a field-sequential system as will be described in relation to FIG. 3, wherein each of the colored LED strings 100 are operated at a unique time during the frame. Operation of color control system 5 will now be described in relation to operation as a field-sequential system, however this is not meant to be limiting in any way, and is equally applicable to a non-field-sequential based system.

FIG. 3 illustrates a timing diagram of a single frame of the operation of color control system 5 when operated as a field-sequential system, wherein the x-axis represents time periods during the single shown frame. In particular, during a first time period, LCD 120 performs setup of the pixels thereon for the period when red LED string 100R is to be lit, the period being denoted SETUP RED. It is to be noted that during the setup time for red LED string 100R, no colored LED strings 100 are lit, thus providing the period described above in relation to EQ. 1 wherein none of colored LED strings 100 are lit. After the expiration of the setup time, red LED string 100R is lit. During the period when red LED string 100R is lit, the output of color sensor 10 is sampled, the period being denoted LIGHT RED. The tri-stimulus values sampled during period LIGHT RED are converted by calibration matrix functionality 40 as described above in relation to EQ. 1 to a color space consonant with the color space of the output of source of target color and luminance information 60, described mathematically in one embodiment as:

$$\begin{bmatrix} Xr \\ Yr \\ Zr \end{bmatrix} = [C] * \begin{bmatrix} R \\ G \\ B \end{bmatrix}. \quad \text{EQ. 2}$$

After expiration of the period when red LED string 100R is lit, LCD 120 performs setup of the pixels thereon for the period when green LED string 100G is to be lit. It is to be noted that during the setup time for green LED string 100G, no colored LED strings 100 are lit, thus providing the period described above in relation to EQ. 1 wherein none of colored LED strings 100 are lit, the period being denoted SETUP GREEN. After the expiration of the setup time, green LED string 100G is lit. During the period when green LED string 100G is lit, the output of color sensor 10 is sampled, the period being denoted LIGHT GREEN. The tri-stimulus sampled values during period LIGHT GREEN are converted by calibration matrix functionality 40 as described above in relation to EQ. 1 to a color space consonant with the color space of the output of source of target color and luminance information 60, described mathematically in one embodiment as:

$$\begin{bmatrix} Xg \\ Yg \\ Zg \end{bmatrix} = [C] * \begin{bmatrix} R \\ G \\ B \end{bmatrix}. \quad \text{EQ. 3}$$

After expiration of the period when green LED string 100G is lit, LCD 120 performs setup of the pixels thereon for the period when blue LED string 100B is to be lit. It is to be noted that during the setup time for blue LED string 100B, no colored LED strings 100 are lit, thus providing the period described above in relation to EQ. 1 wherein none of colored LED strings 100 are lit, the period being denoted SETUP BLUE. After the expiration of the setup time, blue LED string 100B is lit. During the period when blue LED string 100B is lit, the output of color sensor 10 is sampled, the period being denoted LIGHT BLUE. The tri-stimulus sampled values during the period LIGHT BLUE are converted by calibration matrix functionality 40 as described above in relation to EQ. 1 to a color space consonant with the color space of the output of source of target color and luminance information 60, described mathematically in one embodiment as:

$$\begin{bmatrix} Xb \\ Yb \\ Zb \end{bmatrix} = [C] * \begin{bmatrix} R \\ G \\ B \end{bmatrix}. \quad \text{EQ. 4}$$

Compensation functionality 50 is operative, preferably once per frame, to calculate combined color coordinates of colored LED strings 100, including the impact of ambient light source 130. Mathematically, and with reference to EQ. 2-EQ. 4, the operation of compensation functionality 50 to calculate combined color coordinates is in one embodiment described as:

$$\begin{bmatrix} Xsampled \\ Ysampled \\ Zsampled \end{bmatrix} = \begin{bmatrix} Xr \\ Yr \\ Zr \end{bmatrix} + \begin{bmatrix} Xg \\ Yg \\ Zg \end{bmatrix} + \begin{bmatrix} Xb \\ Yb \\ Zb \end{bmatrix}. \quad \text{EQ. 5}$$

EQ. 2-5 thus result in combined color coordination including the impact of ambient light source 130. It is to be understood that in an embodiment of a non-field-sequential backlight system, the values $$\begin{bmatrix} Xsampled \\ Ysampled \\ Zsampled \end{bmatrix}$$

are directly derived from samples of colored LED strings 100 during joint operation, or as averaged over a frame and converted by calibration matrix functionality 40.

Compensation functionality 50 is further operative, preferably once a frame, to compensate the combined color coordinates by the identified impact of light arriving from ambient light source 130 as described above in relation to EQ. 1. Mathematically, and with reference to EQ. 1 and EQ. 5, the operation of compensation functionality 50 to compensate the combined color coordinates by the identified impact of ambient light is in one embodiment described as:

$$\begin{bmatrix} Xam\_comp \\ Yam\_comp \\ Zam\_comp \end{bmatrix} = \begin{bmatrix} Xsampled \\ Ysampled \\ Zsampled \end{bmatrix} - 3 * \begin{bmatrix} Xamb \\ Yamb \\ Zamb \end{bmatrix} \quad \text{EQ. 6}$$

wherein the factor 3 appears as a result of the additive factor of EQ. 5. In the event of a non-field-sequential backlighting system, or in the event that ambient lighting is sampled 3 times per frame, the factor 3 would be replaced with a unitary factor.

The above has been described in an embodiment of a field sequential system in which green LED string 100G is lit only once per frame, however this is not meant to be limiting in any way. In another embodiment, green LED string 100G is lit twice per frame, and the resultant calculations are adjusted accordingly.

The compensated converted output of compensation functionality 50 is fed to one input of difference generator functionality 70. Difference generator functionality 70 further receives the output of source of target color and luminance information 60, and is operative to output a difference thereof, typically as an array of values. Mathematically, and with reference to EQ. 6, the operation of difference generator functionality 70 is in one embodiment described as:

$$\begin{bmatrix} \Delta X \\ \Delta Y \\ \Delta Z \end{bmatrix} = \begin{bmatrix} Xt \\ Yt \\ Zt \end{bmatrix} - \begin{bmatrix} Xam\_comp \\ Yam\_comp \\ Zam\_comp \end{bmatrix} \quad \text{EQ. 7}$$

where the output of source of target color and luminance information 60 is represented by the array:

$$\begin{bmatrix} Xt \\ Yt \\ Zt \end{bmatrix}.$$

Feedback controller functionality 80 is operative to control LED driver 90 so as to reduce the difference output from difference generator functionality towards zero, thus controlling the light output by colored LED strings 100 to closely match the values output by source of target color and luminance information 60 irrespective of ambient light source 130.

The above has been described in an embodiment in which operation of the colored LED strings 100 is performed by removal of any impact of light from ambient light source 130, however this is not meant to be limiting in any way. In another embodiment, the impact of light from ambient light source 130 is further compensated for so that viewer 140 sees an image whose hue and/or luminance perception is relatively unchanged over a range of ambient light. In one non-limiting example, the luminance output of colored LED strings 100 is increased responsive to an increase in luminance from ambient light source 130, and the luminance output of colored LED strings 100 is decreased responsive to a decrease in luminance from ambient light source 130. Mathematically, and with reference to EQ. 6, the operation of compensation functionality 50 to compensate for the luminance of ambient light source 130 is in one embodiment, with reference to EQ. 1 and EQ. 6 described as:

$$\begin{bmatrix} X'am\_comp \\ Y'am\_comp \\ Z'am\_comp \end{bmatrix} = \begin{bmatrix} Xam\_comp \\ Yam\_comp \\ Zam\_comp \end{bmatrix} * F(Yamb) \quad \text{EQ. 8}$$

where F(Yamb) represents a user selected gain coefficient or function of ambient light compensation, responsive only to the luminance value of the ambient light. In an exemplary embodiment, the value of F(Yamb) decreases when Yamb increases, and increase when Yamb decreases. In the event that F(Yamb) is set equal to 1, the luminance level passing through LCD 120 is independent of the ambient light. In such an embodiment, the values of:

$$\begin{bmatrix} X'\text{am\_comp} \\ Y'\text{am\_comp} \\ Z'\text{am\_comp} \end{bmatrix}$$

of EQ. 8 are substituted for $$\begin{bmatrix} X\text{am\_comp} \\ Y\text{am\_comp} \\ Z\text{am\_comp} \end{bmatrix}$$

in EQ. 7. The above has been described in an embodiment where EQ. 8 is performed on the result of EQ. 6, however this is not meant to be limiting in any way, and in another embodiment EQ. 6 and EQ. 8 are functionally combined into a single operation. In yet another embodiment, the output of source of target color and luminance information 60 is adjusted instead of adjusting the output of compensation functionality 50.

In yet another embodiment, the chromaticity of light received from ambient light source 130 is further taken into account. Mathematically, and with reference to EQ. 6, the operation of compensation functionality 50 to compensate for the impact of ambient light source 130 is in one embodiment, with reference to EQ. 1 and EQ. 6 described as:

$$\begin{bmatrix} X'\text{am\_comp} \\ Y'\text{am\_comp} \\ Z'\text{am\_comp} \end{bmatrix} = \begin{bmatrix} X\text{am\_comp} \\ Y\text{am\_comp} \\ Z\text{am\_comp} \end{bmatrix} - Ga * \begin{bmatrix} Xamb \\ Yamb \\ Zamb \end{bmatrix} \quad \text{EQ. 9}$$

where Ga represents a user selected gain coefficient or function, preferably Ga >=0, arranged to provide at least partial hue and luminance compensation. In such an embodiment, the values of:

$$\begin{bmatrix} X'\text{am\_comp} \\ Y'\text{am\_comp} \\ Z'\text{am\_comp} \end{bmatrix}$$

of EQ. 9 are substituted for $$\begin{bmatrix} X\text{am\_comp} \\ Y\text{am\_comp} \\ Z\text{am\_comp} \end{bmatrix}$$

in EQ. 7. The above has been described in an embodiment where EQ. 9 is performed on the result of EQ. 6, however this is not meant to be limiting in any way, and in another embodiment EQ. 6 and EQ. 9 are functionally combined into a single operation. In yet another embodiment, the output of source of target color and luminance information 60 is adjusted instead of adjusting the output of compensation functionality 50.

FIG. 2 illustrates an exemplary second embodiment of a color control system 200 comprising a color controller exhibiting a calibration matrix functionality and a compensation functionality, the compensation functionality arranged to receive from a color sensor both samples of ambient light and light from the colored LED strings. In particular, color control system 200 comprises: a color sensor 10 exhibiting a tri-stimulus output; an optional low pass filter 20; a color controller 210; an LED driver 90; a plurality of different colored LED strings generally denoted 100, illustrated as a red LED string 100R, a green LED string 100G and a blue LED string 100B; a light guide 110; and an LCD 120. FIG. 2 further illustrates: an ambient light source 130; and a viewer 140. Color controller 210 comprises: an A/D converter 30; a compensation functionality 220; a calibration matrix functionality 40; a source of target color and luminance information 60; a difference generator functionality 70; and a feedback controller functionality 80.

Color sensor 10 is arranged to receive light from light guide 110 comprising light from each of red LED string 100R, green LED string 100G and blue LED string 100B and a portion of ambient light from ambient light source 130, the portion of ambient light received may be directed by light guide 110 or directly impinge on color sensor 10. The tri-stimulus outputs of color sensor 10 are passed through optional low pass filter 20 to the respective inputs of A/D converter 30. The tri-stimulus outputs of A/D converter 30 are connected to respective inputs of compensation functionality 220, and the tri-stimulus outputs of compensation functionality 220 are connected to respective inputs of calibration matrix functionality 40. The tri-stimulus outputs of calibration matrix functionality 40 are connected to respective first inputs of difference generator functionality 70, and the tri-stimulus outputs of source of target color and luminance information 60 are connected to respective second inputs of difference generator functionality 70. The outputs of difference generator functionality 70 are connected to respective inputs of feedback controller functionality 80, and the outputs of feedback controller functionality 80 are fed to respective inputs of LED driver 90. The outputs of LED driver 90 are respectively connected to the inputs of red LED string 100R, green LED string 100G and blue LED string 100B. Light guide 110 is arranged to receive the optical outputs of red LED string 100R, green LED string 100G and blue LED string 100B and guide the optical outputs to light LCD 120 so that information displayed thereon is visible to viewer 140.

Any and all of optional low pass filter, A/D converter 30, calibration matrix functionality 40, compensation functionality 220, difference generator functionality 60, source of target color and luminance information 60, difference generator functionality 70, feedback controller functionality 80 and LED driver 90 may be implemented in a single unit, as part of a microcontroller or field programmable gate array. In one embodiment color controller 210 further comprises optional LPF 20 instituted digitally responsive to the output of A/D converter 30. In another embodiment, color controller 210 further comprises LED driver 90. In one embodiment, source of target color and luminance information 60 is supplied by a separate video controller, and in another embodiment source of target and luminance information 60 is stored in local registers. In one embodiment LED driver 90 is constituted of a pulse width modulation (PWM) functionality. In one embodiment feedback controller functionality 80 comprises a proportional integral (PI) controller, and in another embodiment feedback controller functionality 80 comprises a proportion integral differential (PID) controller. In one embodiment (not shown), optional LPF 20 is replaced with an integrator as described in pending patent application Ser. No. 12/136,095 entitled "Optical Sampling and Control Element", published Jan. 1, 2009 to Blaut et at as US 2009/0001253 A1.

In operation, color control system 200 is in all respects similar to color control system 5, with exception of the order of operation of compensation functionality 220 and calibration matrix 40, which will therefore be explained further. Compensation functionality 220 is operative to sample the output of color sensor 10 during periods when none of colored LED strings 100 are lit, and utilize the values obtained to compensate the values sampled when one of colored LED strings 100 are lit. In one particular embodiment, compensation functionality 220 is operative to sample the output of color sensor 10 during periods when none of colored LED strings 100 are lit, and subtract the values of color sensor 10 from the period when none of colored LED strings 100 are lit from the associated period when one of colored LED strings 100 are lit. In comparison with the operation of color control system 5 of FIG. 1, conversion of the outputs of color sensor 10 to a color space consonant with values output by source of target color and luminance information 60 is not performed until after compensation for the ambient light values. Such an operation reduces the calculation load on the combination of compensation functionality 220 and calibration matrix functionality 40 of color controller 210 as compared with that of compensation functionality 50 and calibration matrix functionality 40 of color controller 25.

In an embodiment in which a field-sequential system is used, as described above in relation to FIG. 3, during each setup time, i.e. during each of SETUP RED, SETUP GREEN and SETUP BLUE, the output of color sensor 10 is sampled. During each subsequent lighting period, i.e. during LIGHT RED, LIGHT GREEN and LIGHT BLUE, the tri-stimulus value sampled from color sensor 10 during the preceding setup period is preferably subtracted there from by compensation functionality 220, and the output after subtraction is fed to calibration matrix functionality 40. Thus, the sampled tri-stimulus value during period SETUP RED is subtracted from the sampled tri-stimulus value during period LIGHT RED by compensation functionality 220, the sampled tri-stimulus value during period SETUP GREEN is subtracted from the sampled tri-stimulus value during period LIGHT GREEN by compensation functionality 220, and the sampled tri-stimulus value during period SETUP BLUE is subtracted from the sampled tri-stimulus value during period LIGHT BLUE by compensation functionality 220.

In an operation in which a non-field-sequential backlight is used, similarly the values sampled during the setup time are subtracted by compensation functionality 220 from the frame light tri-stimulus samples prior to feeding to calibration matrix functionality 40.

Figure 4:
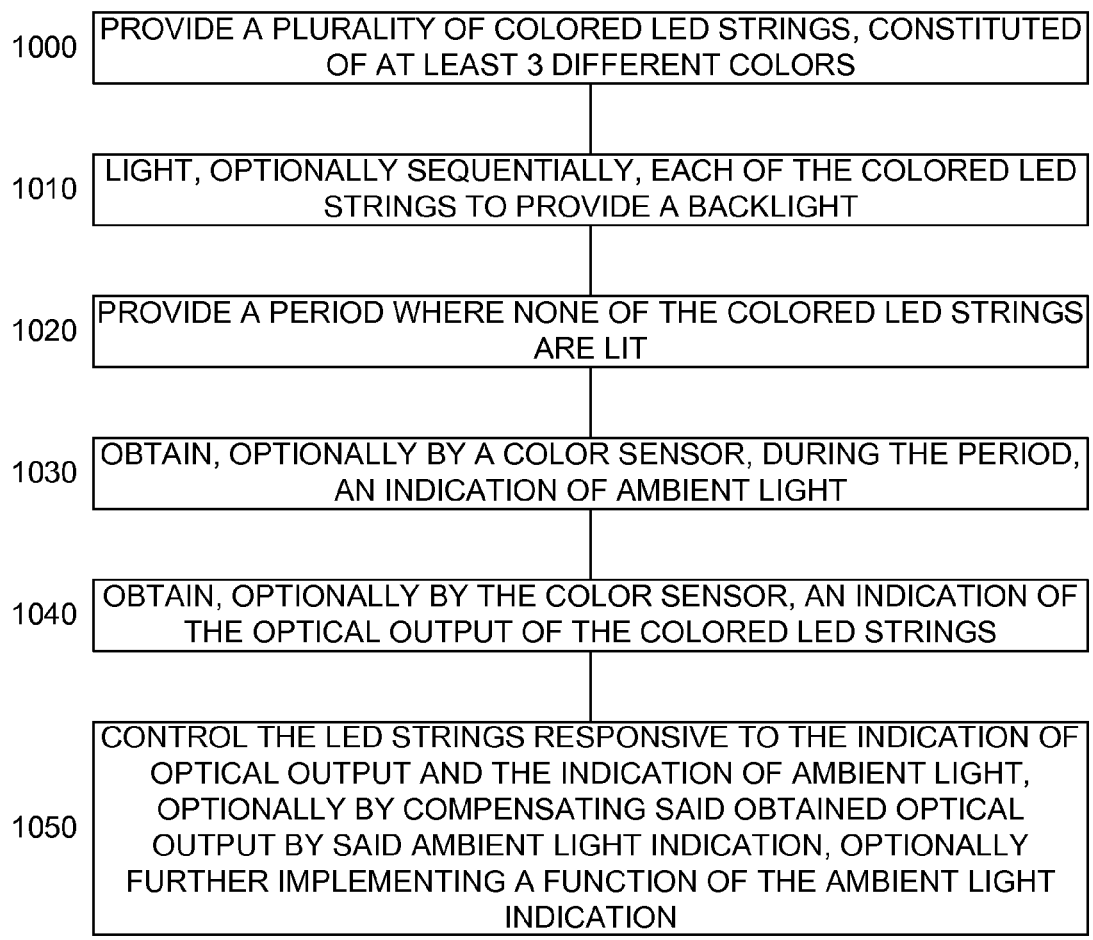
FIGS. 4-6 illustrate high level flow charts of various exemplary embodiments of a method of color control with compensation for ambient lighting.

FIG. 4 illustrates a high level flow chart of a first exemplary embodiment of a method of color control with compensation for ambient lighting. In stage 1000, a plurality of colored LED strings constituted of at least 3 different colors, such as red LED string 100R, green LED string 100G and blue LED string 100B of FIGS. 1 and 2 are provided. In stage 1010, each of the colored LED strings of stage 1000 are lit to provide a backlight. Optionally, the colored LED strings are lit sequentially, such that each of the colored LED strings are lit for a unique non-overlapping time period. In stage 1020, the lighting of stage 1010 is controlled so as to provide a period where none of the colored LED string of stage 1000 are lit. In an exemplary embodiment the setup time for LCD 120 is provided as the period.

In stage 1030, an indication of the ambient light is obtained during the provided period of stage 1020. Optionally, the indication of ambient light is obtained from a color sensor associated with controlling the color of the backlight LEDs of stage 1000. In stage 1040, an indication of the optical output of the colored LEDs of stage 1000 is obtained, optionally by the same color sensor described above in relation to stage 1030. In an embodiment in which the LEDs are lit sequentially, the indication is preferably received independently for each of the provided colored LED strings of stage 1000.

In stage 1050, the LED strings of stage 1000 are controlled responsive to the indication of optical output obtained in stage 1040 and the indication of ambient light obtained in stage 1030. In one optional embodiment, the control is responsive to compensating the obtained indication of optical output of stage 1040 by the obtained indication of ambient light of stage 1030. In one particular embodiment the compensation is performed by subtraction. In one further optional embodiment, the impact of ambient light obtained in stage 1030 is further compensated for so that a viewer sees an image whose color and/or luminance perception exhibits a reduced change over a range of ambient light, by further implementing a function of the obtained ambient light indication of stage 1030, as described above in relation to EQ. 8 and EQ. 9.

Figure 5:
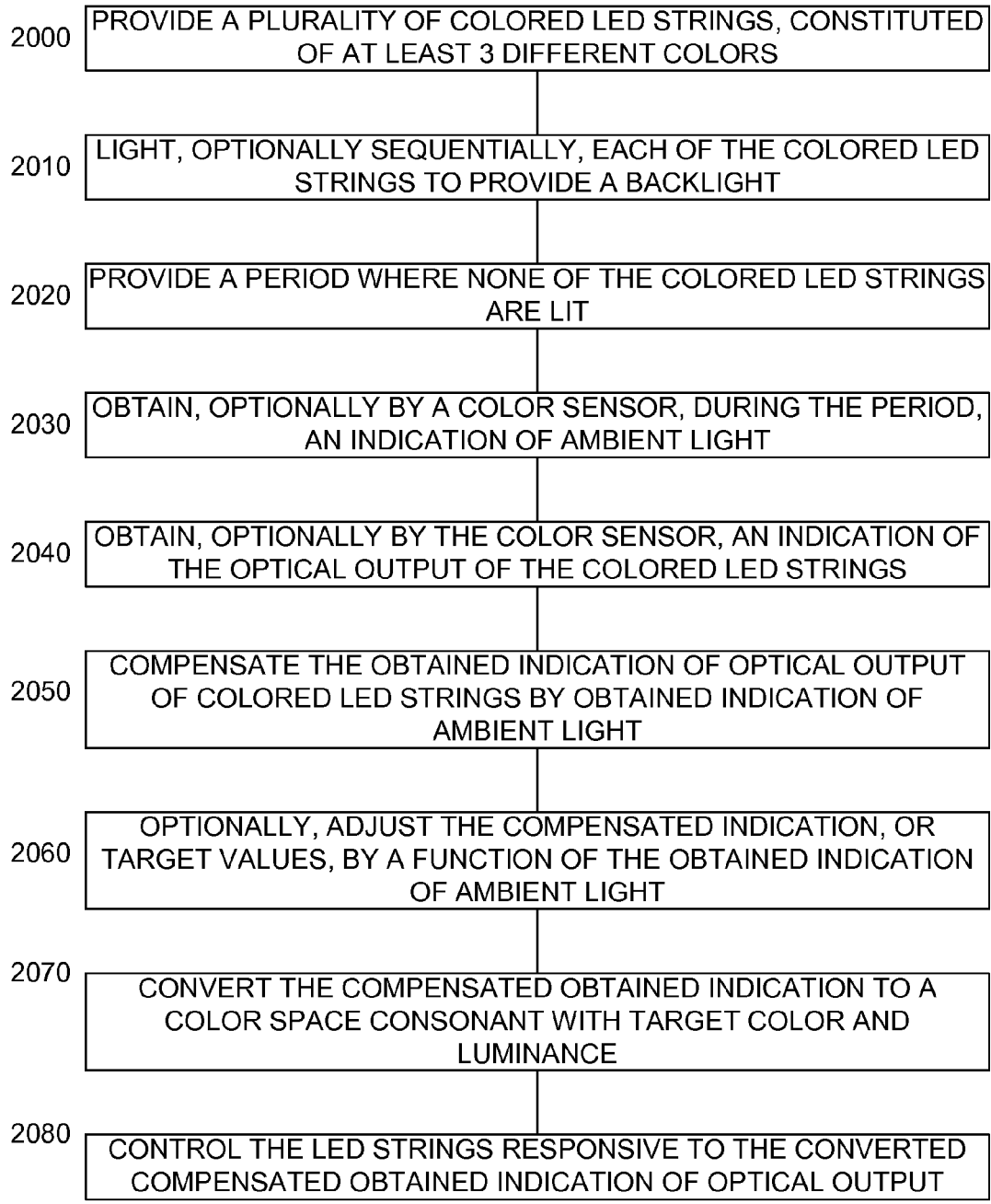

FIG. 5 illustrates a high level flow chart of a second exemplary embodiment of a method of color control with compensation for ambient lighting. In stage 2000, a plurality of colored LED strings constituted of at least 3 different colors, such as red LED string 100R, green LED string 100G and blue LED string 100B of FIGS. 1 and 2 are provided. In stage 2010, each of the colored LED strings of stage 2000 are lit to provide a backlight. Optionally, the colored LED strings are lit sequentially, such that each of the colored LED strings are lit for a unique non-overlapping time period. In stage 2020, the lighting of stage 2010 is controlled so as to provide a period where none of the colored LED string of stage 2000 are lit. In an exemplary embodiment the setup time for LCD 120 is provided as the period.

In stage 2030, an indication of the ambient light is obtained during the provided period of stage 2020. Optionally, the indication of ambient light is obtained from a color sensor associated with controlling the color of the backlight LEDs of stage 2000. In stage 2040, an indication of the optical output of the colored LEDs of stage 2000 is obtained, optionally by the same color sensor described above in relation to stage 2030. In an embodiment in which the LEDs are lit sequentially, the indication is preferably received independently for each of the provided colored LED strings of stage 2000.

In stage 2050, the obtained indication of optical output of colored LED strings of stage 2040 is compensated by the obtained indication of ambient light of stage 2030, as described in relation to FIG. 2. In particular, in an embodiment in which a field sequential backlight is implemented, in one particular embodiment the obtained indication of ambient light of stage 2030 for the period prior to lighting a particular colored LED string 100 is subtracted from the obtained indication of optical output of stage 2040 for the lighting period immediately following.

In optional stage 2060, the compensated indication of stage 2050 is further adjusted by a function of the obtained indication of ambient light of stage 2030, as described above in relation to EQ. 8. Such an optional further compensation enables a viewer to see an image whose color and luminance perception exhibits a reduced change over a range of ambient light. As described above the additional further compensation may be accomplished by adjusting the target light values without exceeding the scope.

In stage 2070, the compensated indication of stage 2050, optionally adjusted by stage 2060, is converted to a color space consonant with a target color and luminance. In stage 2080, the LED strings of stage 2000 are controlled responsive to the converted compensated indication of stage 2070.

Figure 6:
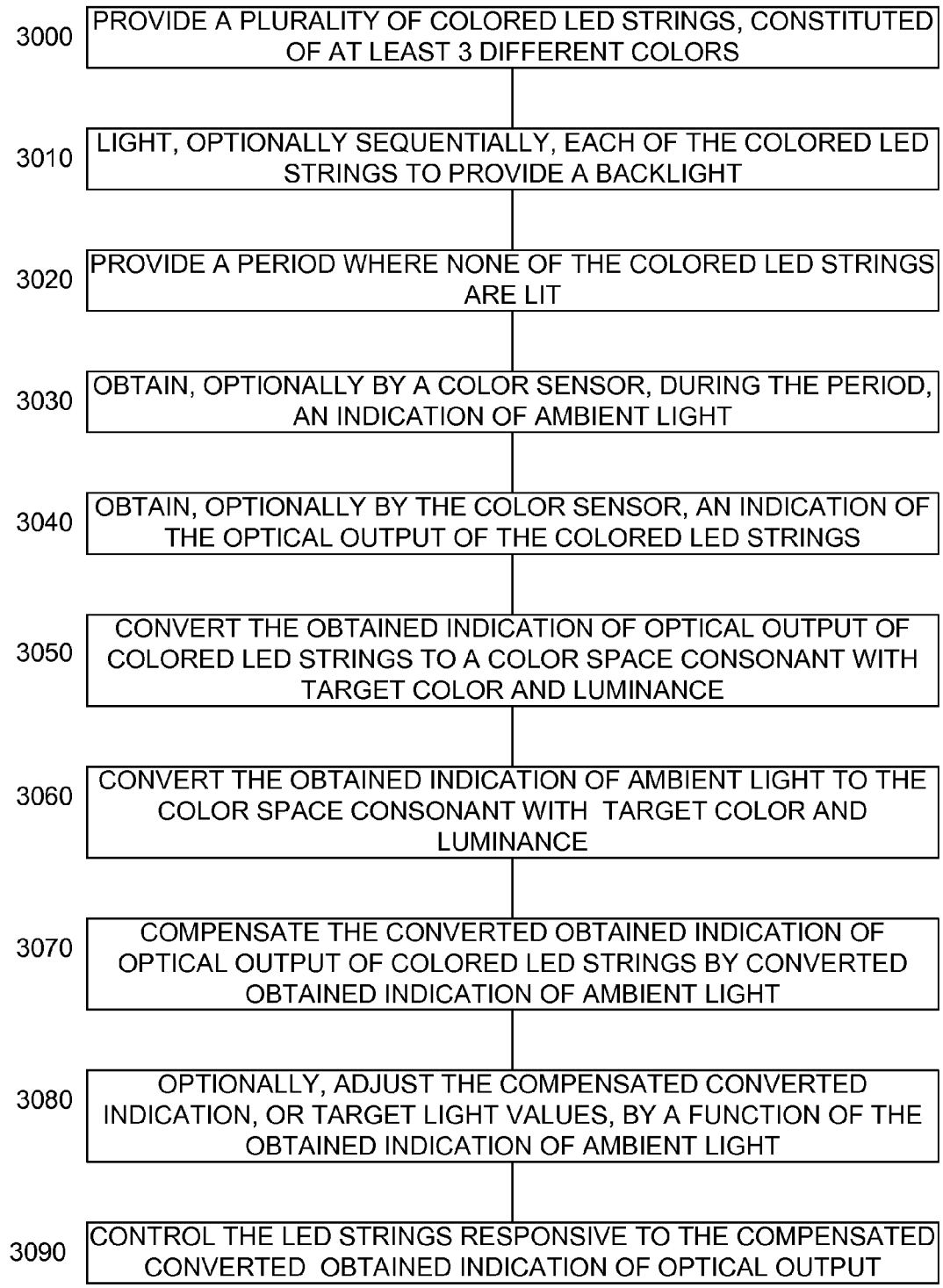

FIG. 6 illustrates a high level flow chart of a third exemplary embodiment of a method of color control with compensation for ambient lighting. In stage 3000, a plurality of colored LED strings constituted of at least 3 different colors, such as red LED string 100R, green LED string 100G and blue LED string 100B of FIGS. 1 and 2 are provided. In stage 3010, each of the colored LED strings of stage 3000 are lit to provide a backlight. Optionally, the colored LED strings are lit sequentially, such that each of the colored LED strings is lit for a unique non-overlapping time period. In stage 3020, the lighting of stage 3010 is controlled so as to provide a period where none of the colored LED string of stage 3000 are lit. In an exemplary embodiment the setup time for LCD 120 is provided as the period.

In stage 3030, an indication of the ambient light is obtained during the provided period of stage 3020. Optionally, the indication of ambient light is obtained from a color sensor associated with controlling the color of the backlight LEDs of stage 3000. In stage 3040, an indication of the optical output of the colored LEDs of stage 3000 is obtained, optionally by the same color sensor described above in relation to stage 3030. In an embodiment in which the LEDs are lit sequentially, the indication is preferably received independently for each of the provided colored LED strings of stage 3000.

In stage 3050, the obtained indication of optical output of stage 3040 is converted to a color space consonant with a target color and luminance. In stage 3060, the obtained indication of ambient of stage 3030 is converted to the color space consonant with the target color and luminance.

In stage 3070, the converted obtained indication of optical output of stage 3050 is compensated by the converted obtained indication of ambient light of stage 3060, as described in relation to FIG. 1. In particular, in an embodiment in which a field-sequential backlight is implemented, in one particular embodiment an average of the tri-stimulus values of obtained indication of ambient light of stage 3030 for each of the periods prior to lighting a particular colored LED string 100 is utilized for the compensation of stage 3070.

In optional stage 3080, the compensated converted indication of stage 3070 is further adjusted by a function of the obtained indication of ambient light of stage 3030 as described above in relation to EQ. 8. Such an optional further compensation enables a viewer to see an image whose color and luminance perception exhibits a reduced change over a range of ambient light. As described above the additional further compensation may be accomplished by adjusting the target light values without exceeding the scope.

In stage 3090, the LED strings of stage 3000 are controlled responsive to the compensated converted indication of stage 3070, optionally adjusted by stage 3080.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A color control system for a backlight utilizing colored light emitting diodes (LEDs), the color control system arranged to control a backlight on a frame by frame basis, the color control system comprising:
   a color controller;
   an LED driver responsive to said color controller;
   a plurality of colored LED strings constituted of at least three different colors responsive to said LED driver; and
   a color sensor, exhibiting a tri-stimulus output, in optical communication with said plurality of colored LED strings, said color controller coupled to said tri-stimulus output of said color sensor,
   wherein said color controller is arranged, in each frame, to:
      sequentially light each of said plurality of colored LED strings via said LED driver at a respective time during the frame;
      provide a period during the frame wherein none of said colored LED strings are lit;
      receive from said color sensor an indication of an ambient light received at said color sensor during said provided period during the frame when none of said colored LED strings are lit;
      receive from said color sensor, an indication of the optical output of said colored LED strings during said respective times during the frame when said colored LED strings are lit; and
      control said LED driver responsive to said received indication of ambient light during the frame and said received indication of the optical output of said colored LED strings during the frame.

2. The color control system according to claim 1, wherein said color controller is arranged to control said LED driver responsive to said received indication of ambient light during the frame and said received indication of the optical output of said colored LED strings during the frame by compensating said received indication of the optical output of said colored LED strings during said respective times during the frame by said received indication of ambient light during the frame.

3. The color control system according to claim 2, wherein said color controller is arranged to control said LED driver responsive to said received indication of ambient light during the frame and said received indication of the optical output of said colored LED strings during said respective times during the frame by further implementing a function of said received indication of ambient light during the frame on one of said compensated received indication of the optical output of said colored LED strings during said respective times during the frame and a target light value.

4. The color control system according to claim 1, wherein said color controller is arranged to control said LED driver responsive to said received indication of ambient light during the frame and said received indication of the optical output of said colored LED strings during said respective times during the frame by implementing a function of said received indication of ambient light during the frame on one of said received indication of the optical output of said colored LED strings during the frame and a target light value.

5. The color control system according to claim 1, wherein said control of said LED driver is by pulse width modulation.

6. A color control system for a backlight utilizing colored light emitting diodes (LEDs), the color control system comprising:
   a color controller;
   an LED driver responsive to said color controller;
   a plurality of colored LED strings constituted of at least three different colors responsive to said LED driver; and
   a color sensor, exhibiting a tri-stimulus output, in optical communication with said plurality of colored LED strings, said color controller coupled to said tri-stimulus output of said color sensor,
   wherein said color controller is arranged to:
      light each of said plurality of colored LED strings via said LED driver;
      provide a period wherein none of said colored LED strings are lit;
      receive from said color sensor an indication of an ambient light received at said color sensor during said provided period when none of said colored LED strings are lit;
      receive from said color sensor an indication of the optical output of each of said colored LED strings when lit; and
      control said LED driver responsive to said received indication of ambient light and said received indication of the optical output of said colored LED strings,
   wherein said color controller comprises:
      a compensation functionality arranged to receive said indication of the optical output of said colored LED strings and said indication of ambient light and output an ambient light compensated indication of the optical output of said colored LED strings;
      a source of target color and luminance information;
      a difference generator functionality, a first input of said difference generator functionality coupled to the output of said source of target color and luminance information;
      a feedback controller functionality coupled to the output of said difference generator; and
      a calibration matrix functionality in communication with said compensation functionality and arranged to convert said compensated indication of the optical output of said colored LED strings to a pre-determined color space consonant with said target color and luminance information received at said first input of said difference generator, the output of said calibration matrix functionality coupled to a second input of said difference generator.

7. The color control system according to claim 6, wherein said compensated indication comprises a gain function.

8. A color control system for a backlight utilizing colored light emitting diodes (LEDs), the color control system comprising:
   a color controller;
   an LED driver responsive to said color controller;
   a plurality of colored LED strings constituted of at least three different colors responsive to said LED driver; and
   a color sensor, exhibiting a tri-stimulus output, in optical communication with said plurality of colored LED strings, said color controller coupled to said tri-stimulus output of said color sensor,
   wherein said color controller is arranged to:
      light each of said plurality of colored LED strings via said LED driver;
      provide a period wherein none of said colored LED strings are lit;
      receive from said color sensor an indication of an ambient light received at said color sensor during said provided period when none of said colored LED strings are lit;
      receive from said color sensor an indication of the optical output of each of said colored LED strings when lit; and
      control said LED driver responsive to said received indication of ambient light and said received indication of the optical output of said colored LED strings,
   wherein said color controller comprises:
      a source of target color and luminance information;
      a difference generator functionality, a first input of said difference generator functionality coupled to the output of said source of target color and luminance information;
      a calibration matrix functionality arranged to receive the output of said color sensor and convert said received indication of the optical output of said colored LED strings and said received indication of ambient light to a pre-determined color space consonant with said target color and luminance information received at said first input of said difference generator functionality;
      a feedback controller coupled to the output of said difference generator functionality; and
      a compensation functionality coupled to the output of said calibration matrix functionality and arranged to receive said converted indication of the optical output of said colored LED strings and said converted indication of ambient light and output an ambient light compensated indication of the optical output of said colored LED strings.

9. The color control system according to claim 8, wherein said compensation functionality comprises a gain function.

10. A method of color control for a backlight utilizing colored light emitting diodes (LEDs), the backlight providing illumination of a display on a frame by frame basis, the method comprising, for each frame:
   providing a plurality of colored LED strings constituted of at least three different colors;
   sequentially lighting each of said plurality of colored LED strings during a respective time during the frame to provide the illumination;
   providing a period during the frame wherein none of said colored LED strings are lit;
   obtaining an indication of an ambient light during said provided period during the frame when none of said colored LED strings are lit;
   obtaining an indication of the optical output of said colored LED strings during said respective times during the frame when said colored LED strings are lit; and
   controlling said lighting of said provided plurality of colored LED strings responsive to said received indication of ambient light during the frame and said received indication of the optical output of said colored LED strings during the frame.

11. The method according to claim 10, wherein said controlling said lighting responsive to said obtained indication of ambient light during the frame and said received indication of the optical output of said colored LED strings during the frame comprises compensating said obtained indication of the optical output of said colored LED strings during the frame by said obtained indication of ambient light during the frame.

12. The method according to claim 11, wherein said controlling said lighting responsive to said obtained indication of ambient light during the frame and said received indication of the optical output of said colored LED strings during the frame further comprises implementing a function of said obtained indication of ambient light during the frame on one of said compensated obtained indication of the optical output of said colored LED strings during the frame and a target light value.

13. The method according to claim 10, wherein said controlling said lighting responsive to said obtained indication of ambient light during the frame and said received indication of the optical output of said colored LED strings during the frame comprises implementing a function of said obtained indication of ambient light during the frame on one of said obtained indication of the optical output of said colored LED strings during the frame and a target light value.

14. The method according to claim 10, wherein said controlling comprises:
  converting said obtained indication of the optical output of said colored LED strings during the frame to a pre-determined color space consonant with a target color and luminance information;
  converting said obtained indication of ambient light during the frame to the pre-determined color space; and
  compensating said converted obtained indication of the optical output of said colored LED strings during the frame by said converted obtained indication of ambient light during the frame.

15. The method according to claim 14, further comprising adjusting said compensated converted obtained indication by a function of said obtained indication of ambient light during the frame.

16. A method of color control for a backlight utilizing colored light emitting diodes (LEDs), the method comprising:
  providing a plurality of colored LED strings constituted of at least three different colors;
  lighting each of said plurality of colored LED strings to provide illumination;
  providing a period wherein none of said colored LED strings are lit;
  obtaining an indication of an ambient light during said provided period when none of said colored LED strings are lit;
  obtaining an indication of the optical output of said colored LED strings during said provided period when said colored LED strings are lit; and
  controlling said lighting of said provided plurality of colored LED strings responsive to said received indication of ambient light and said received indication of the optical output of said colored LED strings, wherein said controlling comprises:
  compensating said obtained indication of the optical output of said colored LED strings by said obtained indication of ambient light; and
  converting said compensated indication of the optical output of said colored LED strings to a pre-determined color space consonant with target color and luminance information.

17. The method according to claim 16, further comprising adjusting said compensated obtained indication by a function of said obtained indication of ambient light.

* * * * *